US008961733B2

(12) United States Patent
Dodd

(10) Patent No.: US 8,961,733 B2
(45) Date of Patent: *Feb. 24, 2015

(54) METHOD OF IMPROVING THE IMPACT-PROTECTIVE PROPERTIES OF A CONFORMABLE SUBSTRATE

(75) Inventor: Mark D. Dodd, Allen, TX (US)

(73) Assignee: Pinwrest Development Group, LLC, New York, NY (US)

( * ) Notice: Subject to any disclaimer, the term of this patent is extended or adjusted under 35 U.S.C. 154(b) by 850 days.

This patent is subject to a terminal disclaimer.

(21) Appl. No.: 12/945,627

(22) Filed: Nov. 12, 2010

(65) Prior Publication Data

US 2011/0113559 A1  May 19, 2011

Related U.S. Application Data

(63) Continuation-in-part of application No. 12/471,252, filed on May 22, 2009, now Pat. No. 8,661,564, and a continuation-in-part of application No. 11/057,954, filed on Feb. 15, 2005, now Pat. No. 8,220,072.

(60) Provisional application No. 61/055,295, filed on May 22, 2008.

(51) Int. Cl.
  *A41D 13/015* (2006.01)
  *A41D 13/05* (2006.01)
  *A41D 13/08* (2006.01)

(52) U.S. Cl.
  CPC ........ *A41D 13/0153* (2013.01); *A41D 13/0506* (2013.01); *A41D 13/0543* (2013.01); *A41D 13/081* (2013.01)

USPC ........... 156/290; 438/134; 438/138; 438/156; 2/455; 2/411; 2/412

(58) Field of Classification Search
  CPC ............. A41D 13/015; A41D 13/0153; A63B 2071/0063
  USPC ........ 2/22, 455, 411, 412, 414, 416; 428/163, 428/156, 134, 138, 166; 156/303.1, 290
  See application file for complete search history.

(56) References Cited

U.S. PATENT DOCUMENTS

| 1,243,230 A | 10/1917 | Smith |
| 1,683,226 A | 4/1927 | Zuck |
| 3,514,784 A | 6/1970 | McDavid |
| 3,528,412 A | 9/1970 | McDavid |

(Continued)

FOREIGN PATENT DOCUMENTS

| WO | WO01/15892 | * 3/2001 | ................ B32B 3/14 |

OTHER PUBLICATIONS

Final Office Action in U.S. Appl. No. 12/471,252 mailed on Jan. 5, 2012.

(Continued)

*Primary Examiner* — John Goff
*Assistant Examiner* — Scott W Dodds
(74) *Attorney, Agent, or Firm* — Patent Capital Group

(57) ABSTRACT

A method of improving an impact-protective property of a conformable substrate is provided. The method includes positioning a central core adjacent the conformable substrate. The central core includes a plurality of rigid plates. A first of the plates is joined by at least one hinge to a second of the plates.

16 Claims, 12 Drawing Sheets

(56) References Cited

U.S. PATENT DOCUMENTS

| | | | |
|---|---|---|---|
| 3,772,704 | A | 11/1973 | Carbonneau |
| 3,831,467 | A | 8/1974 | Moore |
| 3,867,239 | A | 2/1975 | Alesi et al. |
| 4,115,902 | A | 9/1978 | Taylor |
| 4,191,192 | A | 3/1980 | McDavid |
| 4,272,850 | A | 6/1981 | Rule |
| 4,306,315 | A * | 12/1981 | Castiglia .................. 2/22 |
| 4,538,301 | A | 9/1985 | Sawatzki et al. |
| 4,805,606 | A | 2/1989 | McDavid, III |
| 4,870,956 | A | 10/1989 | Fatool et al. |
| 4,923,728 | A | 5/1990 | Snedeker |
| 5,007,111 | A | 4/1991 | Adams |
| 5,105,473 | A | 4/1992 | Valtakari |
| 5,268,213 | A * | 12/1993 | Murakami et al. ............ 428/163 |
| 5,301,370 | A | 4/1994 | Henson |
| 5,477,558 | A | 12/1995 | Volker et al. |
| 5,518,802 | A | 5/1996 | Colvin et al. |
| 5,581,805 | A | 12/1996 | Rennick |
| 5,625,896 | A | 5/1997 | LaBarbera et al. |
| 5,680,657 | A | 10/1997 | Valtakari |
| 5,689,836 | A | 11/1997 | Fee et al. |
| 5,797,865 | A | 8/1998 | McDavid, III |
| 5,890,224 | A | 4/1999 | Clark |
| 5,915,528 | A | 6/1999 | Shmuelov |
| 5,926,844 | A | 7/1999 | Bear |
| 5,956,777 | A | 9/1999 | Popovich |
| 6,058,503 | A | 5/2000 | Williams |
| 6,093,468 | A * | 7/2000 | Toms et al. ................. 428/67 |
| 6,094,743 | A | 8/2000 | Delgado |
| 6,247,745 | B1 | 6/2001 | Carroll, III et al. |
| 6,286,150 | B1 | 9/2001 | Miller et al. |
| 6,295,654 | B1 | 10/2001 | Farrell |
| 6,507,955 | B1 | 1/2003 | Fee et al. |
| 6,519,781 | B1 | 2/2003 | Berns |
| D472,678 | S | 4/2003 | Cho |
| 6,589,891 | B1 | 7/2003 | Rast |
| 6,654,960 | B2 | 12/2003 | Cho |
| 6,726,641 | B2 | 4/2004 | Chiang et al. |
| 6,807,891 | B2 | 10/2004 | Fisher |
| 6,969,548 | B1 * | 11/2005 | Goldfine ................ 428/159 |
| 7,093,301 | B1 | 8/2006 | Moore, Jr. |
| D582,608 | S | 12/2008 | Palmer |
| 7,464,414 | B2 | 12/2008 | McDuff |
| D610,312 | S | 2/2010 | Farrell |
| 7,669,378 | B2 | 3/2010 | Tsunoda et al. |
| D617,503 | S | 6/2010 | Szalkowski et al. |
| 8,220,072 | B2 | 7/2012 | Dodd |
| 8,627,512 | B2 | 1/2014 | Dodd |
| 8,661,564 | B2 | 3/2014 | Dodd |
| 2004/0019950 | A1 | 2/2004 | Rast |
| 2004/0230171 | A1 * | 11/2004 | Ando et al. ................. 604/355 |
| 2006/0179538 | A1 | 8/2006 | Dodd |
| 2009/0276933 | A1 | 11/2009 | Dodd |
| 2012/0272426 | A1 | 11/2012 | Dodd |
| 2014/0157631 | A1 | 6/2014 | Dodd |

OTHER PUBLICATIONS

Notice of Allowance in U.S. Appl. No. 11/057,954 mailed on May 24, 2012.
Non-Final Office Action in U.S. Appl. No. 13/545,381 mailed on Apr. 11, 2013.
Response to Non-Final Office Action dated Apr. 11, 2013 in U.S. Appl. No. 13/545,381, filed Aug. 12, 2013.
Notice of Allowance in U.S. Appl. No. 13/545,381 mailed on Aug. 28, 2013.
Non-Final Office Action in U.S. Appl. No. 12/471,252 mailed on Jun. 24, 2013.
Response to Non-Final Office Action dated Jun. 24, 2013 in U.S. Appl. No. 12/471,252, filed Sep. 17, 2013.
International Search Report and Written Opinion date mailed Jul. 3, 2008; PCT International Application No. PCT/US06/04757.
TEKNOR APEX Thermoplastic Elastomer Division; "Monoprene TPE"; pp. 1-8; Jul. 2004; www.teknorapex.com.
Non-Final Office Action date mailed Feb. 6, 2008 for U.S. Appl. No. 11/057,954.
Response filed May 13, 2008 to Non-Final Office Action date mailed Feb. 6, 2008 for U.S. Appl. No. 11/057,954.
Restriction Requirement date mailed Sep. 17, 2008 for U.S. Appl. No. 11/057,954.
Response filed Oct. 17, 2008 to Restriction Requirement date mailed Sep. 17, 2008 for U.S. Appl. No. 11/057,954.
Non-Final Office Action date mailed Feb. 3, 2009 for U.S. Appl. No. 11/057,954.
Response filed Jul. 6, 2009 to Non-Final Office Action date mailed Feb. 3, 2009 for U.S. Appl. No. 11/057,954.
Final Office Action date mailed Nov. 10, 2009 for U.S. Appl. No. 11/057,954.
Response after Final filed Jan. 11, 2010 for U.S. Appl. No. 11/057,954.
Non Final Office Actions issued Mar. 31, 2010 for U.S. Appl. No. 11/057,954.
Response to Office Action filed Jun. 30, 2010 for U.S. Appl. No. 11/057,954.
Restriction Requirement date mailed Sep. 14, 2010 for U.S. Appl. No. 11/057,954.
Response to Non-Final office action filed Feb. 24, 2011 for U.S. Appl. No. 11/057,954.
Notice of Allowance in U.S. Appl. No. 11/057,954 mailed on Sep. 2, 2011.
Request for Continued Examination and Amendment in U.S. Appl. No. 11/057,954 filed on Dec. 1, 2011.
Non-Final Office Action in U.S. Appl. No. 12/471,252 mailed on Aug. 30, 2011.
Response to Non-Final Office Action dated Aug. 30, 2011 in U.S. Appl. No. 12/471,252, filed Dec. 8, 2011.
Request for Continued Examination and Amendment in U.S. Appl. No. 12/471,252 filed on Apr. 5, 2012.
Restriction Requirement mailed Jul. 6, 2011 for U.S. Appl. No. 12/471,252.
Response to Restriction Requirement filed Aug. 8, 2011 for U.S. Appl. No. 12/471,252.
Response to Restriction Requirement filed Jun. 10, 2011 for U.S. Appl. No. 11/057,954.
Restriction Requirement mailed May 10, 2011 for U.S. Appl. No. 11/057,954.
U.S. Appl. No. 14/154,090 filed Jan. 13, 2014 and entitled "Protective Shin Guard", inventor, Mark D. Dodd.
Notice of Allowance in U.S. Appl. No. 12/471,252 mailed on Oct. 11, 2013.
PCT International Preliminary Report on Patentability in PCT International Application No. PCT/US06/04757 mailed on Mar. 3, 2009.
Non-Final Office Action in U.S. Appl. No. 14/154,090 mailed on Jul. 16, 2014.
U.S. Appl. No. 14/180,228 entitled "Footwear Impact Distribution", Inventor Mark D. Dodd, filed Feb. 13, 2014.

* cited by examiner

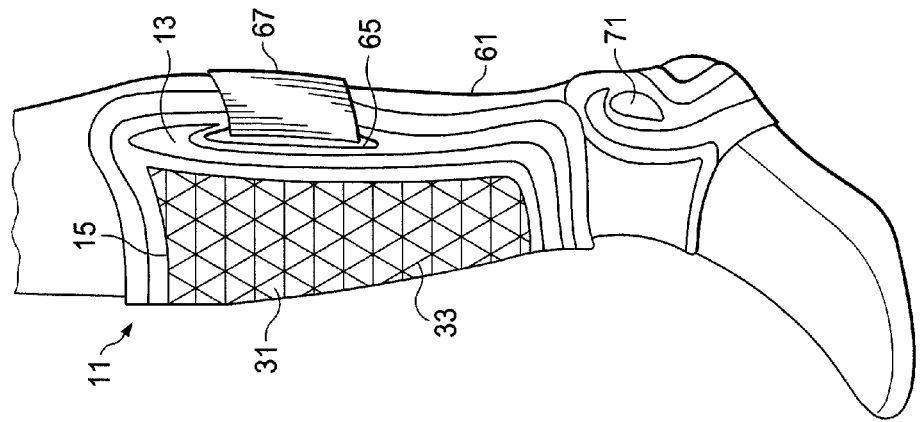
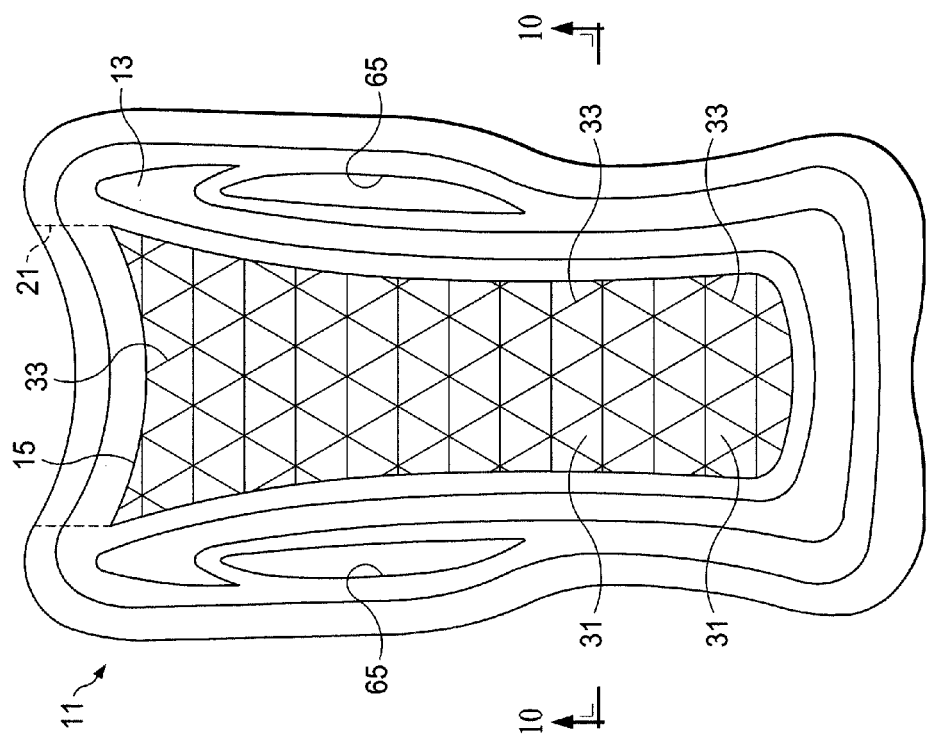

METHOD OF IMPROVING THE IMPACT-PROTECTIVE PROPERTIES OF A CONFORMABLE SUBSTRATE

CROSS-REFERENCE TO RELATED APPLICATIONS

This application is a continuation-in-part of U.S. patent application Ser. No. 12/471,252, filed May 22, 2009, now issued as U.S. Pat. No. 8,661,564 which application claims the benefit of U.S. Provisional Application No. 61/055,295, filed May 22, 2008. U.S. patent application Ser. No. 12/471,252 is also a continuation-in-part of U.S. patent application Ser. No. 11/057,954, filed Feb. 15, 2005, now issued as U.S. Pat. No. 8,220,072. Priority is claimed to all of the above-referenced applications, and all of the above-referenced applications are hereby incorporated by reference.

BACKGROUND

1. Field of the Invention

The present invention relates generally to protective articles and methods and in particular to protective articles and methods for protecting persons, animals, and other non-living articles or items from impact or other forces.

2. Description of Related Art

Guards and other protective equipment is widely used in amateur and professional sports and other activities to protect participants' from injury. For example, in soccer, players often wear shin guards to protect their lower legs in the event that they are kicked by other players during a game. Football players wear protective shoulder and thigh pads to prevent injury due to impact with other players. Baseball players, such as catchers, use protective chest pads to prevent injury if the catcher is struck by the baseball. Without adequate protection in these sports and others, the risk of injury is high. Protective equipment is also used in non-sports settings. One example is the medical industry which uses casts and splints to immobilize and protect areas of a patient's body.

Existing guards and protective equipment provide some protection for the persons or equipment to which the guards are applied, but the guards are typically bulky and uncomfortable. Many times, the guards are a single piece of rigid plastic or other material that is affixed to the protected article. Other times, the guards may be a very thick padding or other material. Obtaining a customized fit between the guard and the protected article is often impossible. In the case of person's wearing the guard, this lack of customized fit makes the guards less comfortable to wear, and the guards could under some circumstances impede the movement of the person. Finally, a guard that does not fit properly also fails to provide maximum impact protection to a person.

SUMMARY

The problems presented by existing protective guards and force distribution materials are solved by the systems and methods of the illustrative embodiments described herein. In one embodiment, a method of improving an impact-protective property of a conformable substrate includes positioning a central core adjacent the conformable substrate. The central core includes a plurality of rigid plates, a first of the plates being joined by at least one hinge to a second of the plates.

In another embodiment, a method of distributing an impact load over a contract area includes positioning a conformable substrate over the contact area and positioning a central core adjacent the conformable substrate. The central core includes a plurality of rigid plates, a first of the plates being joined by at least one hinge to a second of the plates. The contact area over which the impact load is distributed is greater than a second area over which the impact load would be distributed in the absence of the central core.

In still another embodiment, a mattress includes an upholstery layer and a central core positioned adjacent the upholstery layer. The central core includes a plurality of rigid plates, a first of the plates being joined by at least one hinge to a second of the plates.

In yet another embodiment, a passenger seat includes a lower support member and a back support member. Each of the lower support member and the back support member include a conformable substrate. A central core is positioned adjacent at least one of the conformable substrate of the lower support member and the conformable substrate of the back support member. The central core includes a plurality of rigid plates, a first of the plates being joined by at least one hinge to a second of the plates.

Other objects, features, and advantages of the illustrative embodiments will become apparent with reference to the drawings, detailed description, and claims that follow.

BRIEF DESCRIPTION OF THE DRAWINGS

FIG. 1 illustrates a front view of a protective guard according to an illustrative embodiment, the protective guard having a conformable substrate and a central core disposed therein;

FIG. 2 depicts a perspective view of the protective guard of FIG. 1 secured to a leg of a person;

DETAILED DESCRIPTION OF THE ILLUSTRATIVE EMBODIMENT

Figure 3:
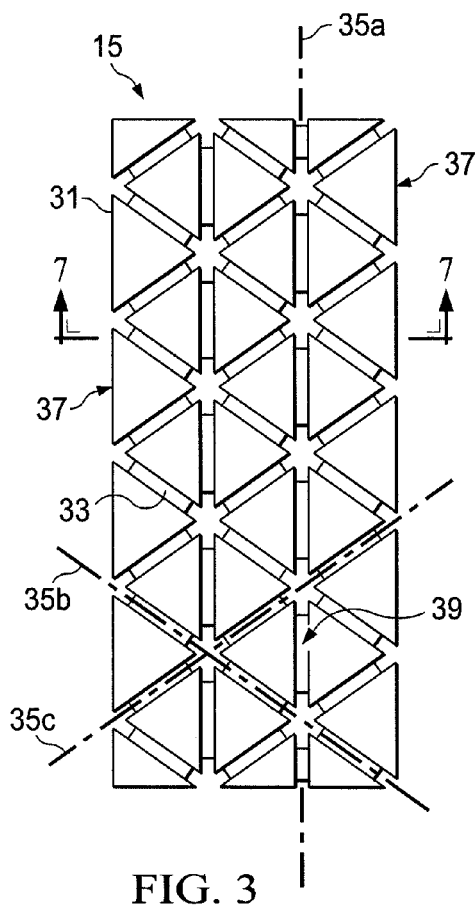
FIG. 3 illustrates a partial front view of the central core of FIG. 1, the central core including a plurality of core members.
Figure 4:
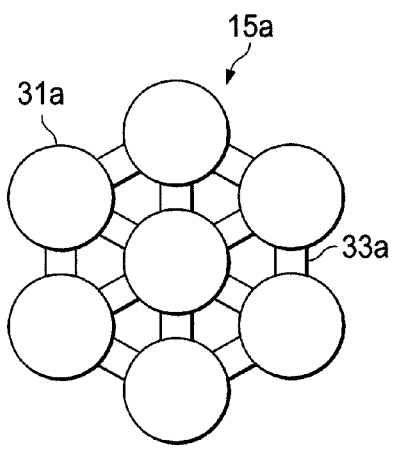
FIG. 4 depicts a partial front view of a plurality of round core members according to an illustrative embodiment.

In the following detailed description of the illustrative embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

As used herein, the term "elastomer" refers to a polymeric, rubber (natural or synthetic), or other material that has elongation rates greater than 100%.

The term "conformable" refers to the ability of a material to be shaped to the contours of a surface without permanently deforming or setting the material. The conformable material could be placed adjacent to a first surface to provide a contour fit to the first surface, and then could subsequently be placed adjacent a second surface and similarly provide a contour fit to the second surface.

Referring to FIG. 1, a protective guard 11 according to the principles of the present invention includes a conformable substrate 13 and a central core 15. The central core 15 is connected to or embedded within the conformable substrate 13 to provide impact protection to a body part of a person. In one embodiment, the conformable substrate 13 may include a pocket 19 (see FIG. 10) within the conformable substrate that houses the central core 15. When the central core 15 is contained within pocket 19, the conformable substrate 13 functions as a sheath, and an entry slot 21 may be optionally provided to allow access to pocket 19, thereby allowing the central core 13 to be selectively removed or inserted into the conformable substrate 13. However, in one embodiment, the pocket 19 is not accessible by an entry slot, thereby creating a sealed space for the conformable substrate 13. The pocket 19 closely matches the shape of the central core 13 and may be formed by molding the conformable substrate 13 around the central core 13.

The conformable substrate 13 may be constructed from an elastomeric material such that the conformable substrate 13 can be easily wrapped around and shaped to the contours of a person's lower leg or shin 61 (see FIG. 2). In one embodiment, the conformable substrate may be made from Monprene MP-1880, a thermoplastic elastomer manufactured by Teknor Apex, Thermoplastic Elastomer Division of Pawtucket, R.I. Other suitable materials may include without limitation other thermoplastic elastomers, ethylene vinyl acetate (EVA), natural rubber, polyisoprene, styrene butadiene rubber, chloroprene rubber, polybutadiene, nitrile rubber, butyl rubber, ethylene propylene rubber, ethylene propylene diene rubber, chlorosulfonated polyethylene, polysulfide rubber, silicone rubber, polyurethane, or open-cell neoprene, energy-absorbent or viscoelastic foam such as a memory foam, or any other conformable material.

Referring to FIG. 3, the central core 15 includes a plurality of plate members, or core members 31. In one embodiment, each core member is joined by at least one hinge 33 to another of the core members 31 such that the core members 31 are capable of rotational movement relative to one another. The rotational movement between two core members typically occurs along an axis that is positioned between the core members. When hinges 33 are used to connect the core members 31, the axis of rotation corresponds to the rotational axis of the hinge. Representative axes of rotation for the central core 15 of FIG. 3 are illustrated as axis 35a, axis 35b, and axis 35c. The ability of the core members 31 to rotationally move relative to one another allows the central core 15 to be conformable to a shin or other body part of a person even though the material that forms the core members 31 would not necessarily be conformable if used in a singe piece.

Figure 5:
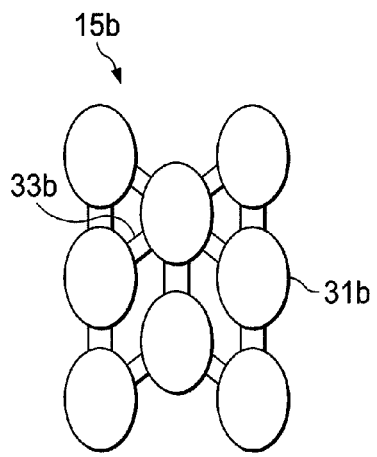
FIG. 5 illustrates a partial front view of a plurality of oval core members according to an illustrative embodiment.
Figure 5A:
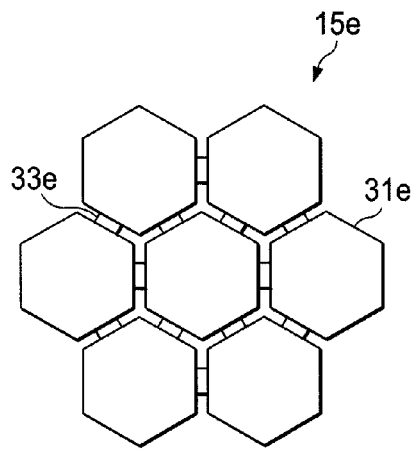
FIG. 5A illustrates a partial front view of a plurality of hexagonal core members according to an illustrative embodiment.
Figure 6:
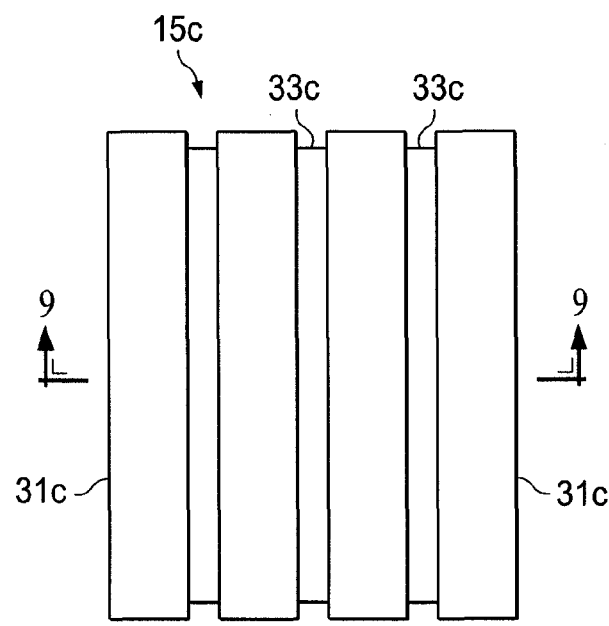
FIG. 6 depicts a partial front view of a plurality of rectangular core members according to an illustrative embodiment.

Referring more specifically to FIGS. 3-6, the core members may be any shape or size. In one embodiment, the core members 31 may be triangular in shape such as is illustrated in FIG. 3. In another embodiment, a central core 15a is partially shown in FIG. 4 having round core members 31a connected by hinges 33a. FIG. 5 partially illustrates a central core 15b having a plurality of oval core members 31b connected by hinges 33b. FIG. 5A partially illustrates a central core 15e having hexagonal core member 31e connected to hinges 33e. FIG. 6 partially illustrates a central core 15c having rectangular core members 31c connected by hinges 33c. Other shapes may include without limitation octagonal, other polygonal, or free-form shapes.

Figure 7:
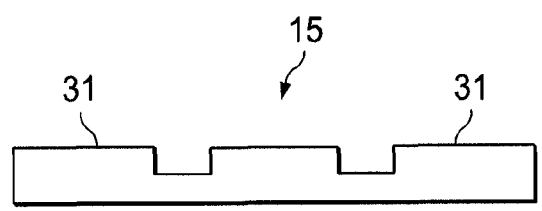
FIG. 7 illustrates a cross-sectional bottom view of the core members of FIG. 3 taken at VII-VII.

Referring to FIG. 7, the core members 31 of protective guard 11 are preferably substantially flat, rigid or semi-rigid plates constructed from a non-elastomeric material. In one embodiment, the core members 31 are made from a hard plastic material such as acrylonitrile butadiene styrene (ABS), styrene, polyethylene, polypropylene, acrylic, polyvinyl chloride (PVC), fluoroplastics, nylon, acetal, polycarbonate, polyimide, polyamide-imide, polyphenylene sulfide, polyarylates, polyethylene terephthalate, polybutylene terephthalate, polyether ether ketone, polysulfone, polyether sulfone, polyetherimide, or polyphenylene oxide. However, it should be understood that any substantially rigid material may be used, including composites, metal, ceramics, synthetic fiber materials such as Kevlar®, or wood. Although a non-elastomeric material is preferred, the core members 31 may even be formed from an elastomeric material if rotational movement between the core members 31 would allow the elastomeric material to better conform to the shin of a person. Preferably, the material used to form the core members 31, and thus the central core 15, is a material that is compatible with the material chosen for the conformable substrate 13. Since some embodiments involve molding the conformable substrate 13 over the central core 15, it is desirous to use a central core material to which the conformable substrate 13 will adhere. A coating or adhesive may be applied to the central core 15 prior to the molding process to achieve additional adhesion between the central core 15 and the conformable substrate 13.

Figure 9:
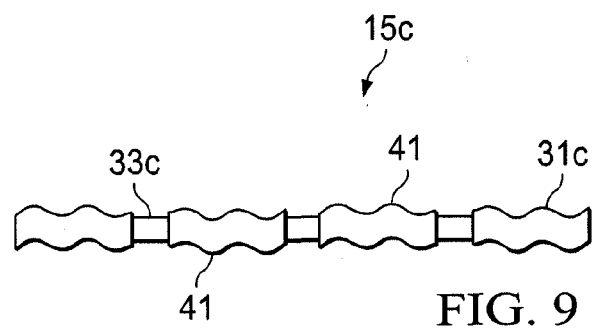
FIG. 9 illustrates a cross-sectional bottom view of the core members of FIG. 6 taken at IX-IX.

Referring to FIG. 9, the central core 15*c* of FIG. 6 is illustrated in cross section and includes core members 31*c* connected by hinges 33*c*. While the core members may be substantially flat so that an impact force directed to the protective guard does not damage the conformable substrate, the core members 31*c* illustrated in FIG. 9 include ridges 41. The ridges 41 may be capable of absorbing additional energy by flattening in the presence of an impact force. Other alternatives to a substantially flat core member may be provided by a core member that is slightly concave or convex in cross section. The core members could alternatively be fluid-filled capsules such as those containing air or gel, or the core members may also be provided in a mesh configuration that is hinged together similar to chain mail armor.

Figure 8:
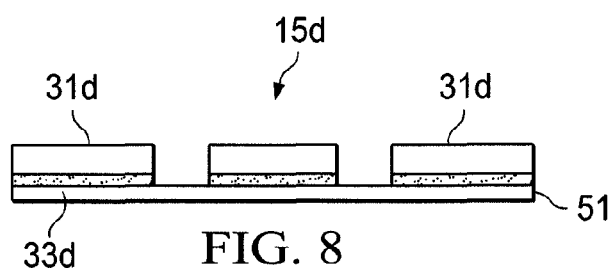
FIG. 8 depicts a cross-sectional bottom view similar to FIG. 7 of a plurality of core members according to an illustrative embodiment.

Referring again to FIG. 7 and also to FIG. 8, the hinges that connect the core members may be provided in several different forms. In one embodiment illustrated in FIG. 7, the hinge 33 is a "living hinge." The living hinge is preferably integrally attached between the core members 31 and is made from the same material as each of the core members 31. The living hinge may be created by machining or etching the core members 31 from a single sheet of material having a relatively constant thickness. The sheet of material is thinned in any region that will become a hinge. This thinning process to create the hinges 33 also creates the general shape of the core members 31. Alternatively, the core members 31 and hinges 33 may be formed by molding or any other manufacturing process, including without limitation injection molding, compression molding, or transfer molding. Living hinges are a strong way of maintaining a rotational connection between core members 31. The living hinges 33 allow repeated rotations between core members 31 while maintaining the relative positions of the core members 31 during the process of assembling the central core 15 and the conformable substrate 13.

Referring to FIG. 8, another option for providing hinges is illustrated in reference to a central core 15*d* having core members 31*d* and hinges 33*d*. Hinges 33*d* are formed by arranging precut core members 31*d* onto a membrane or other material 51 that includes an adhesive or gel to secure the core members 31*d* to the membrane 51. The membrane 51 could be an adhesive tape or other film, a mesh material or alternatively the membrane could be another piece of plastic or elastomer to which the core members 31*d* are bonded. In still another embodiment, the membrane could be a thin layer of the material comprising the conformable substrate. Membrane 51 could be applied to both sides of the core members 31*d* or only on one side as shown in FIG. 8.

Although not illustrated, mechanical, multi-part hinges could also be used to connect adjacent core members. Additionally, hinges of different thicknesses or having different material properties may be provided to allow the core members in one area of the central core to flex differently from core members in another area.

Referring again to FIG. 3, certain of the core members are located in an outer perimeter region 37, while other of the core members are located in an inner region 39. The core members 31 located in the inner region 39 are preferably connected by hinges 33 along each edge of the core member 31 to each adjacent core member 31. For core members 31 located in the outer perimeter region 37, hinges 33 are only attached to one or two edges of each core member 31. However, regardless of whether a particular core member 31 is disposed within the outer perimeter region 37 or the inner region 39, it is not required that every edge of a core member 31 be connected by a hinge to another core member 31. In fact, hinges are not mandatory. Hinges simply provide a good way to maintain relative positioning of the core members 31 during assembly of the central core 15 and the conformable substrate 13. If the relative positioning of the core members 31 could be maintained without hinges, the fixation of the core members 31 within or to the conformable substrate 13 would allow the desired capability of rotational movement between adjacent core members 31. Alternatives for positioning the core members 31 are discussed below in reference to the assembly of the central core 15 and the conformable substrate 13.

Figure 10:
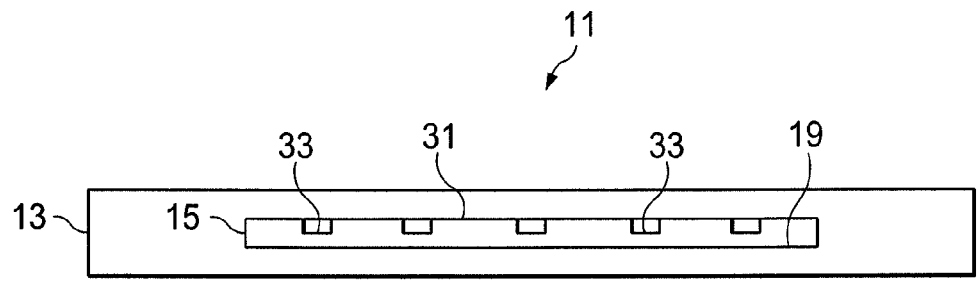
FIG. 10 depicts a cross-sectional bottom view of the conformable substrate and central core of FIG. 1 taken at X-X.

Referring to FIG. 10, in one embodiment, the protective guard 11 includes core members 31 that are completely embedded within the conformable substrate 13. As mentioned previously, a pocket 19 could be provided with an entry slot that allows for insertion of the central core 15 after the conformable substrate 13 is formed. Alternatively, the central core 15 may be molded within the conformable substrate 13, which would automatically form a pocket 19 around the central core 15. It is preferred that hinges 33 are present between the core members 31 to maintain the relative position of the core members 31 during the molding process. It is possible, however, that the core members 31 be individually placed during the molding process to eliminate the need for the hinges 33. After the molding process, the relative positions (e.g. spacing) of the core members 31 would be fixed within the conformable substrate 13, yet the core members 31 would still be capable of rotational movement relative to one another.

Figure 11:
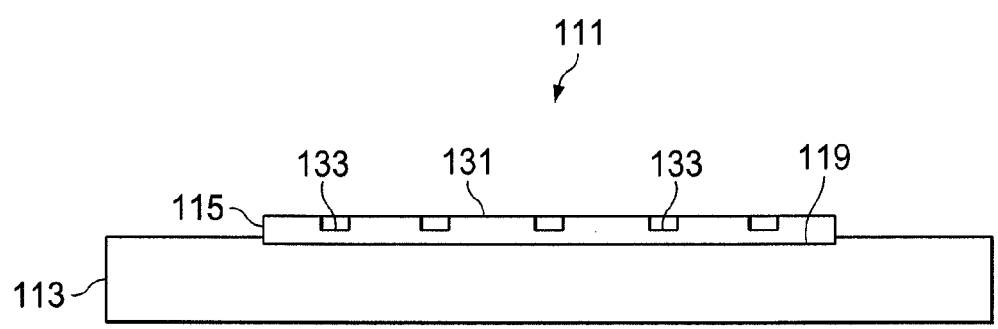
FIG. 11 illustrates a cross-sectional bottom view similar to FIG. 10 of a conformable substrate and central core according to an illustrative embodiment.

Referring to FIG. 11, in another embodiment, a protective guard 111 having a conformable substrate 113 and a central core 115 is illustrated. The central core 115 includes a plurality of core members 131 connected by hinges 133. The central core 115 is partially embedded within a pocket 119 of the conformable substrate 113, thereby exposing the core members 131 near a surface of the conformable substrate 113. The central core 115 may be secured to the conformable substrate 113 by the embedding process, or a bonding agent or any other adhesive or gel may be used to further secure the central core 115. Alternatively, the central core 115 may be attached by sewing means, heat fastening means, ultrasonic fastening means, or any other fastening means. As discussed previously in reference to FIG. 10, the hinges 133 between core members 131 could be eliminated if the core members 131 were individually placed during the assembly process. Individual core members 131 could be placed during the molding of the conformable substrate 113, or the core members could be bonded within the pocket 119 of the conformable substrate 113 after the molding process is complete. After securing the core members 131 to the conformable substrate 113, the relative positions (e.g. spacing) of the core members 131 would be fixed, yet the core members 131 would still be capable of rotational movement relative to one another.

Figure 12:
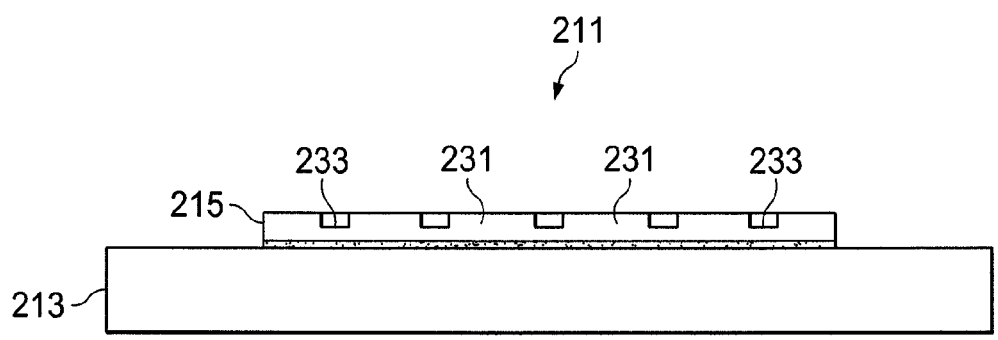
FIG. 12 depicts a cross-sectional bottom view similar to FIG. 10 of a conformable substrate and central core according to an illustrative embodiment.

Referring to FIG. 12, in another embodiment, a protective guard 211 having a conformable substrate 213 and a central core 215 is illustrated. The central core 215 includes a plurality of core members 231 connected by hinges 233. In one embodiment, the central core 215 is bonded to a surface of the conformable substrate 213 by a bonding agent, adhesive, or gel. Alternatively, the central core 215 may be attached to the conformable substrate 213 by sewing means, heat fastening means, ultrasonic fastening means, or any other fastening means. As discussed previously with reference to FIGS. 10 and 11, the hinges 233 between core members 231 could be eliminated if the core members 231 were individually placed during the bonding process. After securing the core members 231 to the conformable substrate 213, the relative positions (e.g. spacing) of the core members would be fixed, yet the core members would still be capable of rotational movement relative to one another.

Figure 13:
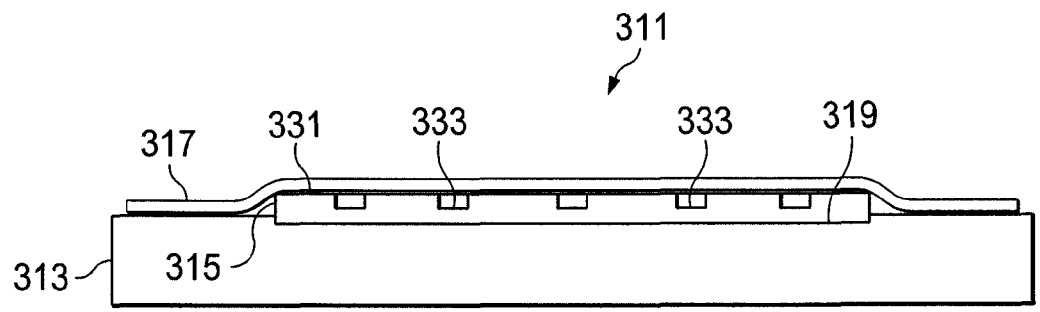
FIG. 13 illustrates a cross-sectional view of a conformable substrate, a central core, and a flexible membrane according to an illustrative embodiment, the cross-sectional view being similar to the cross-sectional view illustrated in FIG. 10.

Referring to FIG. 13, a protective guard 311 according to another embodiment of the invention includes a conformable substrate 313, a central core 315, and a flexible membrane 317. The central core 315 includes a plurality of core members 331 connected by hinges 333. The central core 315 is at least partially embedded within a pocket 319 of the conformable substrate 313, and at least a portion of the central core 315 is covered by flexible membrane 317. While each of the conformable substrate 313, central core 315 and flexible membrane 317 (the three layers) may be adhesively bonded or otherwise attached to the other layers, some of the layers may not be attached to one another. For example, central core 315 may be placed on the conformable substrate 313 without attachment. The flexible membrane 317 may include an adhesive on one side that permits adherence of the flexible membrane 317 to both the central core 315 and the conformable substrate 313, thereby holding the central core 315 in place relative to the conformable substrate 313. Alternatively, the flexible membrane 317 may not be attached to the central core 315 but rather only to the conformable substrate 313. While the pocket 319 could be preformed in the conformable substrate 313 to receive the central core 315, the pocket 319 could instead be formed by an elastic deformation of the conformable substrate 313 in the presence of a compressive force applied by the flexible membrane 317 to the central core 315. If the layers of the protective guard 311 are attached, attachment may be accomplished by a bonding agent or any other adhesive or gel, sewing means, ultrasonic means, heat means, or any other fastening means. As discussed previously in reference to FIG. 10-12, the hinges 333 between core members 331 could be eliminated if the core members 331 were individually placed during the assembly process. Individual core members 331 could be placed during the molding of the conformable substrate 313, or the core members could be bonded within the pocket 319 of the conformable substrate 313 after the molding process is complete. Alternatively, the core members 331 (hinged or unhinged) could be attached to the flexible membrane 317 prior to securing the flexible membrane 317 to the conformable substrate.

Figure 14:
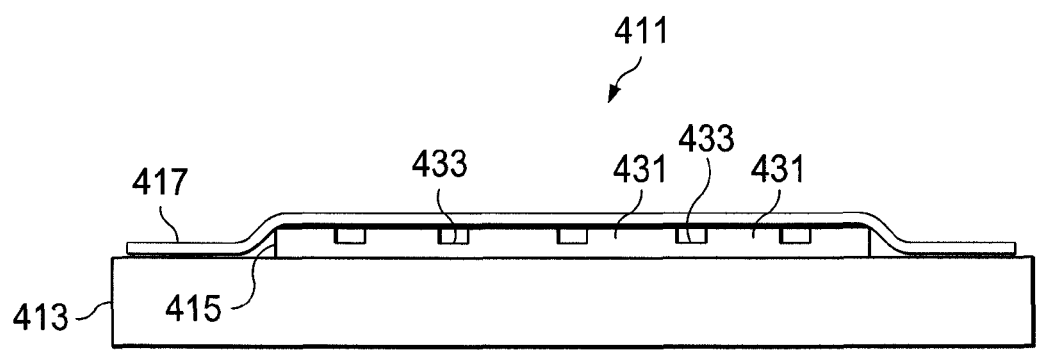
FIG. 14 depicts a cross-sectional view similar to FIG. 13 of a conformable substrate, a central core, and a flexible membrane according to an illustrative embodiment.

Referring to FIG. 14, a protective guard 411 according to another embodiment of the invention includes a conformable substrate 413, a central core 415, and a flexible membrane 417. The layers of protective guard 411 and the methods of attachment are substantially the same as protective guard 311 described in FIG. 13, including without limitation attaching any or all of the layers to adjacent layers or simply placing the layers adjacent one another. In the embodiment illustrated in FIG. 14, the central core 415 is not embedded within a pocket of the conformable substrate 413. Instead, the central core 415 is attached to or positioned against an outer surface of the conformable substrate 413. The central core 415 is also similar to those previously described in that the central core 415 includes a plurality of core members 431 connected by hinges 433. While the central core 415 of FIG. 14 is illustrated as being between the flexible membrane 417 and the conformable substrate 413, the central core 415 may be positioned such that the flexible membrane 417 is positioned between the conformable substrate 413 and the central core 415. In such an embodiment, the central core 415 may be sewn, glued, or otherwise bonded to the flexible membrane 417 and then the flexible membrane 417 sewn, glued, or otherwise attached to the conformable substrate 413.

Figure 15:
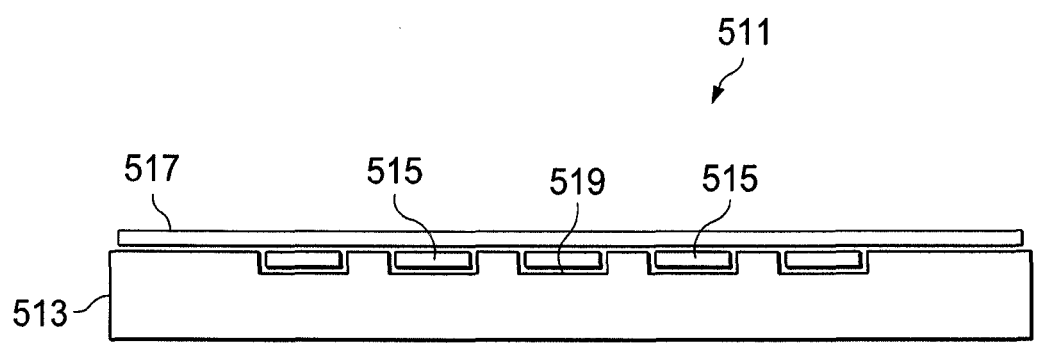
FIG. 15 illustrates a cross-sectional view similar to FIG. 13 of a conformable substrate, a central core, and a flexible membrane according to an illustrative embodiment.

Referring to FIG. 15, a protective guard 511 according to another embodiment of the invention includes a conformable substrate 513, a plurality of core members 515, and a flexible membrane 517. In this embodiment, the core members 515 are not connected by hinges, but rather each core member is placed within a pocket 519 formed in the conformable substrate 513. The flexible membrane 517 is positioned over the conformable substrate 513 and the core members 515 to create a substantially flat impact surface. While each of the conformable substrate 513, the core members 515 and flexible membrane 517 (the three layers) may be adhesively bonded or otherwise attached to the other layers, some of the layers may not be attached to one another. For example, the core members 515 may be placed within the pockets 519 without attachment. The flexible membrane 517 may include an adhesive or gel on one side that permits adherence of the flexible membrane 517 to both the core members 515 and the conformable substrate 513, thereby holding the core members 515 in place relative to the conformable substrate 513. Alternatively, the flexible membrane 517 may not be attached to the core members 515 but rather only to the conformable substrate 513. While the pockets 519 could be preformed in the conformable substrate 513 to receive the core members 515, the pockets 519 could instead be formed by an elastic deformation of the conformable substrate 513 in the presence of a compressive force applied by the flexible membrane 517 to the core members 515. While the conformable substrate 513 is illustrated with multiple pockets 519 in FIG. 15, a single pocket may instead be provided to receive multiple core members 515. If the layers of the protective guard 511 are attached to one another, attachment may be accomplished by a bonding agent or any other adhesive or gel, sewing means, ultrasonic means, heat means, or any other fastening means.

Referring again to FIGS. 13-15, the flexible membrane 317, 417, and 517 may be any flexible material that is capable of being attached to either the conformable substrate or the central core. In one embodiment, the flexible membrane may be a flexible fabric made from natural fabrics including, without limitation, wool, cotton, silk, leather, or linen; or synthetic fibers including, without limitation, acetate, acrylic, latex, spandex, nylon, polyester, rayon; or blends of the above-mentioned fabrics; or any other material that includes natural and/or synthetic fibers that have been weaved, felted, knitted, crocheted, or otherwise arranged. The fabrics may be flame or fire retardant or resistant, such as for example, Nomex®.

It is important to note that the membranes, fabrics, conformable substrates, skeletal plates, core members, covers, and backings described herein may be bonded, layered, or connected in part or total to one another or may be layered but not bonded. While the illustrative embodiments described herein have been generally described as including single layers of each component (e.g., conformable substrate, core members, membranes) of the protective guard, any guard or other device incorporating these components may include multiple layers of one or more of the components. Furthermore, for a particular component that is provided in multiple layers, the multiple layers of the component may be arranged adjacent to one another, or may be arranged such that one or more layers of a different component is intermediately disposed between the multiple layers.

In use, the protective guard 11, 111, 211 of the present invention provides impact protection for an extremity or other body part of a person. As shown in FIG. 2, the protective guard 11 is conformable to the shin and lower leg 61 of a person. The conformable substrate 13 and the central core 15 combine to provide superior impact protection. While the conformable substrate 13 by itself is conformable to a leg or other body part, the more rigid characteristics of the material used in the central core 15 would normally not be easily conformable to the person's leg. However, by separating the central core 15 into a plurality of core members 31 and by allowing the core members 31 to be rotationally movable relative to one another, the central core 15 as a whole is also conformable to the leg of the person. The hinges 33 of the central core 15 provide additional impact resistance for point loads and impacts since the hinges are capable of transmitting impact forces to adjacent core members 31. An attachment aperture 65 is provided on each side of the conformable substrate 13 to allow protective guard 11 to be attached to the person's leg with a strap 67 routed through the attachment aperture 65. An ankle guard 71 may also be provided to wrap around the ankle of the person. The ankle guard 71 could include a central core, but preferably is formed solely from the conformable substrate used with protective guard 11, 111, 211. Similarly, the protective guard itself could be formed solely from the conformable substrate and used without the central core. If only the conformable substrate is used, the material may be thicker in areas of predicted impact or may be formed from two or more elastomers having different durometers (i.e. a multi-durometer conformable substrate).

Figure 16:
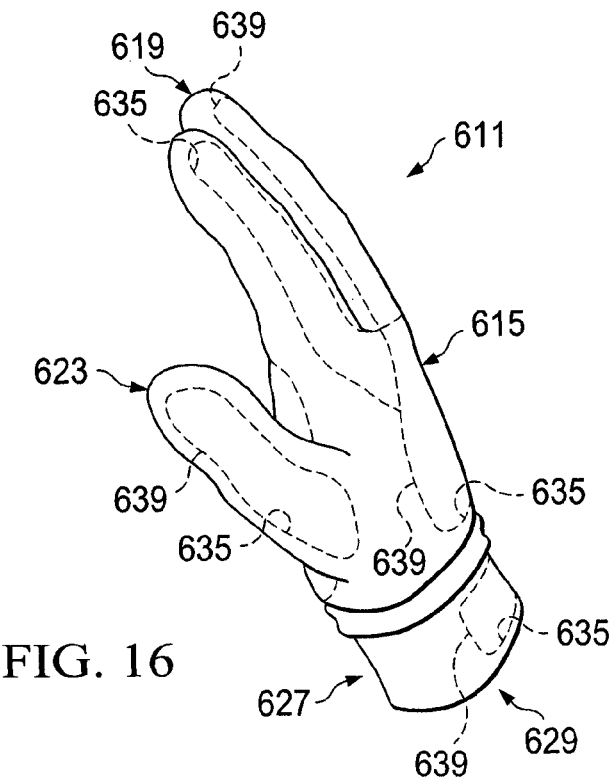
FIG. 16 depicts a side view of a glove having a central core according to an illustrative embodiment.
Figure 17:
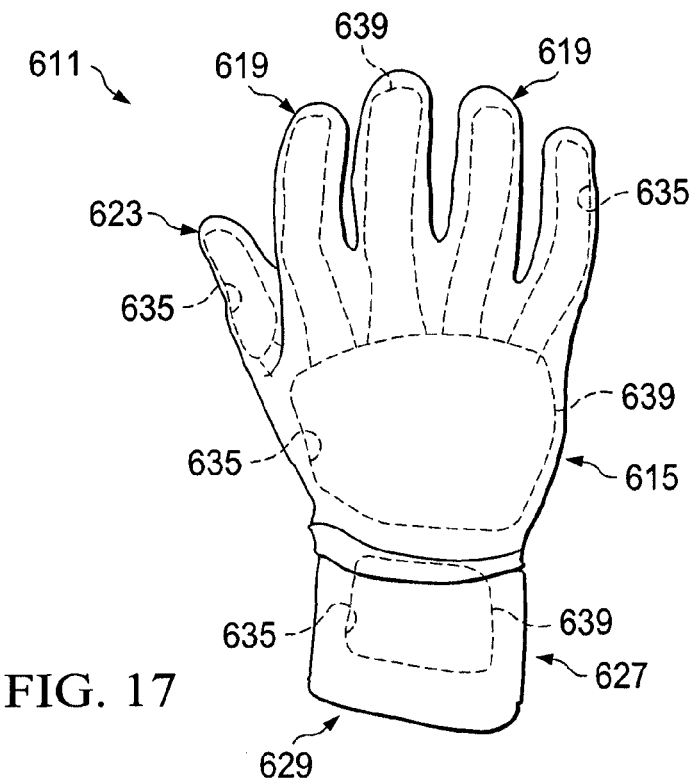
FIG. 17 illustrates a rear view of the glove of FIG. 16.

Referring to FIGS. 16 and 17, a glove 611 having a central portion 615, a plurality of finger portions 619, a thumb portion 623, and a wrist portion 627 includes an opening 629 for insertion of a hand. In at least one of or all of the central portion 615, the plurality of finger portions 619, the thumb portion 623, and the wrist portion 627, a pocket 635 may be provided to receive a central core 639 having a plurality of core members connected by hinges as previously described herein. The core members and hinges allow multi-directional movement of the portions of the hand positioned adjacent the central core in each of the central portion 615, the plurality of finger portions 619, the thumb portion 623, and the wrist portion 627. The central core 639 may be a single article that is shaped to fit into multiple of the portions of the glove 611 containing a pocket. Alternatively, an individual central core 639 may be placed in each individual pocket 635 of the glove 611. When pockets are provided, the central core may be positioned within, embedded, partially-embedded, free-floating, adhesively secured, bonded, sewn or otherwise attached as previously described herein. In another embodiment, the pockets 635 of the glove 611 may be eliminated, and the central core 639 or multiple central cores 639 may be secured to an exterior or interior surface of the glove in the region of the central portion 615, the plurality of finger portions 619, the thumb portion 623, and/or the wrist portion 627. As previously described with respect to the flexible membranes of FIGS. 13-15, a flexible membrane may be positioned over the central core 639 to assist in joining the central core 639 to the glove material.

The glove 611 may be used for protection from impact and other potentially detrimental forces encountered in any sports or other activity. For example, inclusion of a central core 639 in the central portion 615 and finger portions 619 over the back of the hand may be desirable for baseball gloves to protect batters from impact by a baseball. A central core 639 may be positioned over the palm of the hand in the central portion 615 to protect motorcyclists, bicyclists, and skaters from impact and abrasive frictional forces that may be caused when the hands are used to cushion an impact with the ground.

Figure 18:
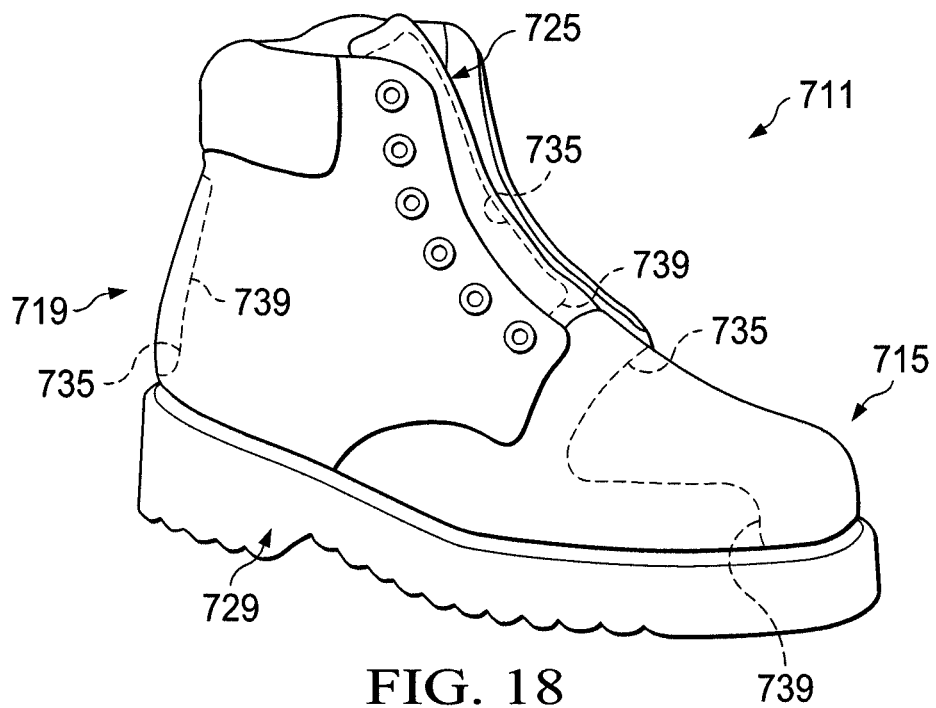
FIG. 18 depicts a perspective view of an article of footwear having a central core according to an illustrative embodiment.
Figure 19:
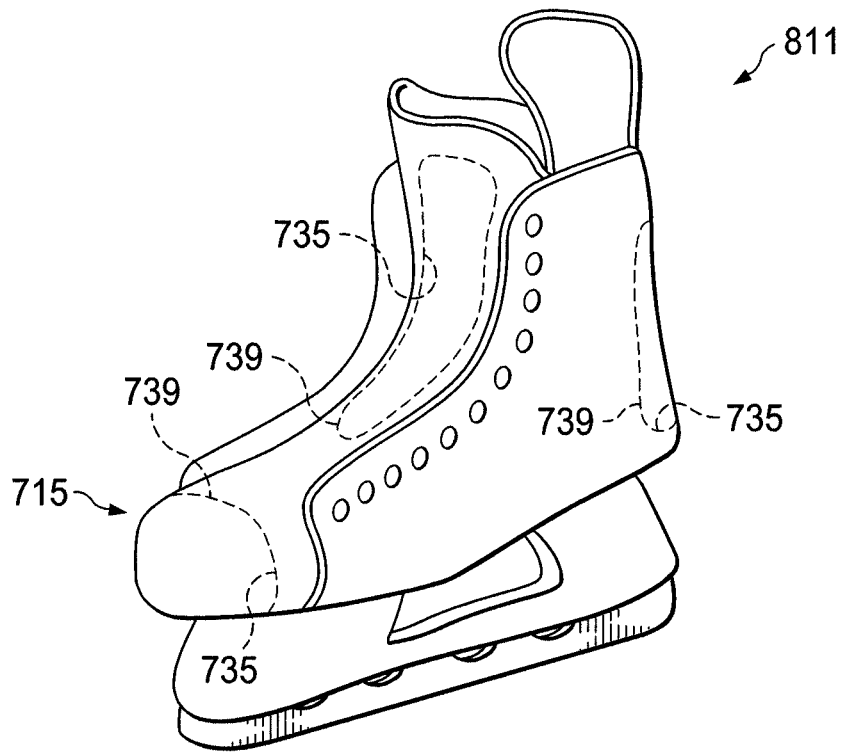
FIG. 19 illustrates a perspective view of an article of footwear having a central core according to an illustrative embodiment.

Referring to FIGS. 18 and 19, an article of footwear, such as for example a work boot 711 or a hockey skate 811, includes a toe portion 715, a heel portion 719, a tongue portion 725, an outsole 729, and an insole (not shown). In at least one of or all of the toe portion 715, the heel portion 719, the tongue portion 725, the outsole 729, and the insole, a pocket 735 may be provided to receive a central core 739 having a plurality of core members connected by hinges as previously described herein. The core members and hinges allow multi-directional movement (i.e., rotational movement about more than one axis) of the portions of the foot positioned adjacent the central core in each of the toe portion 715, the heel portion 719, the tongue portion 725, the outsole 729, and the insole. The central core 639 may be a single article that is shaped to fit into multiple of the portions of the footwear 711, 811 containing a pocket. Alternatively, an individual central core 739 may be placed in each individual pocket 735 of the footwear 711, 811. When pockets are provided, the central core may be positioned within, embedded, partially-embedded, free-floating, adhesively secured, bonded, sewn or otherwise attached as previously described herein. In another embodiment, the pockets 735 of the footwear 11 may be eliminated, and the central core 739 or multiple central cores 739 may be secured to an exterior or interior surface of the footwear in the region of the toe portion 715, the heel portion 719, the tongue portion 725, the outsole 729, and/or the insole. As previously described with respect to the flexible membranes of FIGS. 13-15, a flexible membrane may be positioned over the central core 739 to assist in joining the central core 739 to the footwear material.

The footwear 711 may be used for protection from impact and other potentially detrimental forces encountered in any sports or other activity. For example, inclusion of a central core 739 in the tongue portion 725 of the hockey skate 811 provides significant protection to goalies from hockey-puck impacts. Similarly, a central core 639 may be positioned in the toe portion 715 or heel portion 719 of the work boot 711 to protect against impacts received in industrial or other work-related settings.

It should be noted that the protective guards described herein may be used to protect body parts other than the lower legs, hands, or feet of a person including without limitation the torso, back, forearms, wrists, elbows, thighs, knees, shoulders, chest, face, head, and other extremities. In one example, the central core or protective guard may be combined with helmets or other headwear to protect the head from impact. Body parts may also be protected by combining a central core such as that described herein with clothing, either by sewing the central core to the clothing, within a pocket of the clothing, or by otherwise attaching the central core to the clothing. For example, the central core or protective guard may be combined with shirts, jackets, shorts, pants, hats or other articles of clothing.

In another example, the protective guards described herein may be used to protect hips and other body parts from impact during falls. Hip fractures and other broken bones due to falls result in serious injuries and medical complications for many elderly people. Attachment of the protective guard over a person's hip may help prevent some of these injuries. In one example, a flexible material, such as a surgical tape with an adhesive backing, may be applied to the skin of a patient adjacent the hip. On an outward facing side of the flexible material, one component of a hook-and-loop material may be positioned. A protective guard having a central core such as those described herein may be removably attached to the flexible material using another component of the hook-and-look material that is positioned on the protective guard. The protective guard may be easily replaced, repositioned, or removed for the comfort and safety of the patient. While the protective guard may include both a conformable substrate and a central core, in one embodiment, the central core may be attached to the flexible material or directly to the patient without the use of a conformable substrate. While attachment has been described as using complementary hook-and-loop type material, any fastening means may be used including, without limitation, adhesives, sewing, or other suitable attachment means.

In still another example of the use of the guards and central cores described herein, the devices may be used to protect body parts of non-human animals as well, or alternatively, non-living articles or equipment. For example, the central cores may be attached or incorporated as described herein to luggage, briefcases, computer travel bags, gun cases, or other bags and storage containers to protect the contents therein. In another example, the central core or protective guard may be attached to or incorporated within athletic flooring, subflooring, or ground covering to provide support and impact resistance. The central cores may be attached to or incorporated into the fabric of clothing to protect various areas of human or other animal bodies. While the protective guards and central cores described herein are often presented as being incorporated into sports and work-related equipment, it should be recognized that the use of these elements may be expanded beyond these particular uses. For example, one or more central cores may be attached to or incorporated into various medical devices such as splints and casts. The inclusion of the central core in these devices would provide additional protection against impact and other forces for the body parts to which the splints and casts are applied. Other examples, which are described in more detail below, include the use of the central core with bed mattresses or passenger seats.

Figure 20:
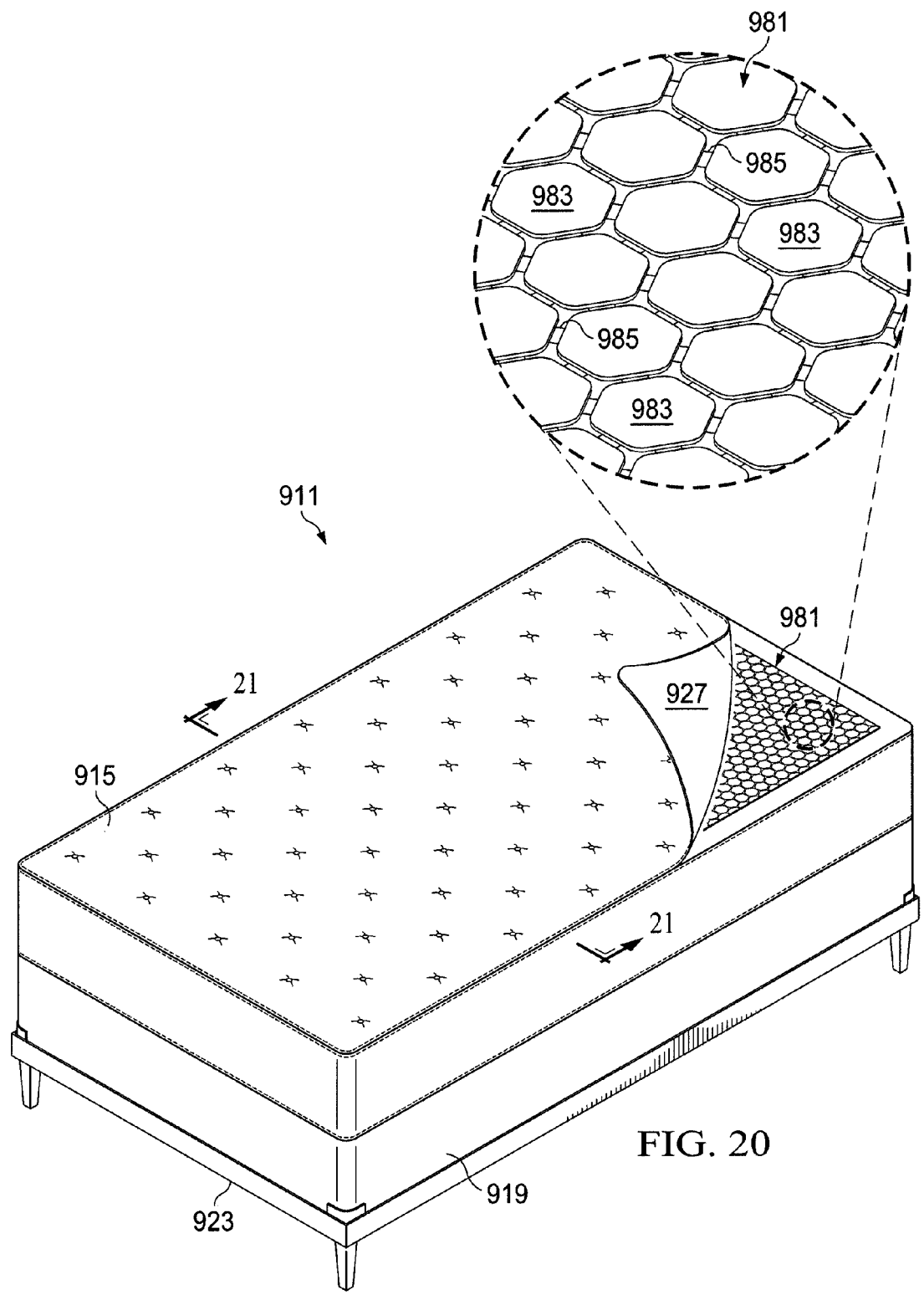
FIG. 20 depicts a perspective view of a bed according to an illustrative embodiment, the bed having a mattress and central core.
Figure 21:
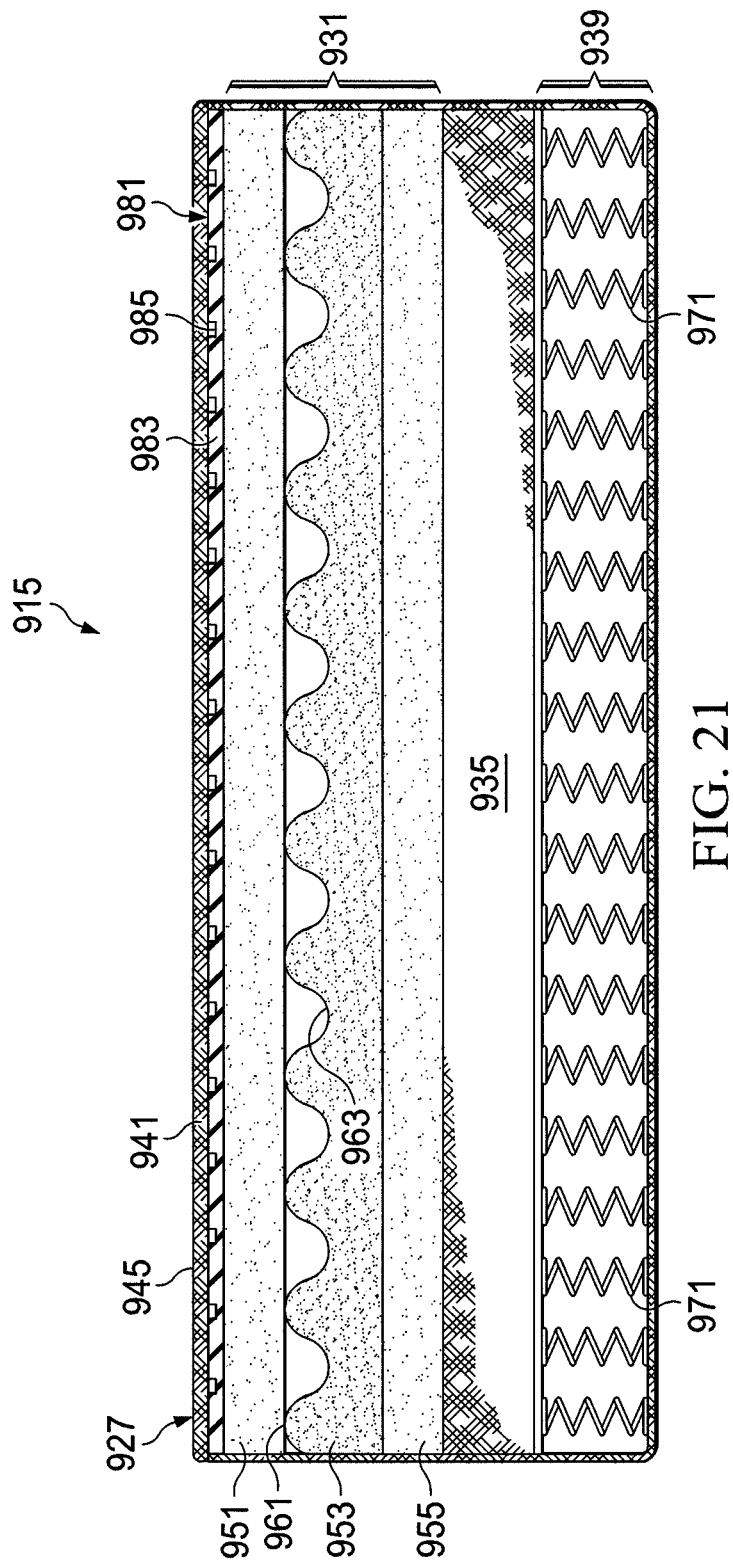
FIG. 21 illustrates a cross-sectional front view of the mattress of FIG. 20 taken at 21-21.

Referring to FIGS. 20 and 21, a bed 911 according to an illustrative embodiment includes a mattress 915 that may be positioned on a foundation 919. Both the mattress 915 and the foundation 919 may be supported by a bed frame 923. In the embodiment illustrated in FIG. 20, the foundation 919 is a box-spring that includes a rigid frame and plurality of springs (not illustrated). In other embodiments, the foundation 919 may be a traditional wood foundation that may be made from soft woods, such as pine, or hard woods. A traditional wood foundation may include several wooden support slats that may or may not be covered by a wood sheathing. In another embodiment a grid foundation comprised of steel and wood may be provided. Alternatively, the mattress 915 or mattress 915 and box spring 919 combination may be placed directly on a floor or other support surface.

Mattress 915 includes may include a plurality of layers including, for example, a quilting layer 927, a middle upholstery layer 931, an insulator layer 935, and a support layer 939. In one embodiment, the quilting layer 927 may include a fabric 941, or ticking, having a bedding surface 945 on which a user of the mattress 915 will sit or lie. The fabric 941 may also include a light foam or fibers stitched to an underside of the fabric 941. The fabric 941 may be used to encase the mattress 915 and provides a soft surface texture to the mattress. The fabric 941 may be made of synthetic fibers like polyester or acrylic, or of natural materials such as latex, cotton, silk, and wool. The fabric 941 may also be made from any of the other fabric or flexible membrane materials described herein, such as for example those associated with flexible membranes 317, 317, 517.

The middle upholstery layer 931 of the mattress 915 may be positioned beneath the quilting layer 927, and may include one or more conformable materials that allow some compression of the mattress 915 but that also provide comfort to the user of the mattress 915. The middle upholstery layer 931 may include one or more foam layers, such as for example foam layer 951, foam layer 953, and foam layer 955. Foam layer 953 may be include an "egg-crate" configuration that includes ridges 961 and valleys 963 to provide additional comfort to the user of the mattress 915. The foam layers 951, 953, 955 may be any type of foam including without limitation open or closed-cell foams. More specifically, the foams may be made from viscoelastic foam materials, felt, polyester fibers, cotton fibers, or non-woven fiber pads. The foam layers 951, 953, 955 may also be made from any of the other foam or conformable substrate materials described herein, such as for example those associated with conformable substrates 13, 113, 213, 313, 413, 513.

Beneath the middle upholstery layer 931, the insulator layer 935 separates the support layer 939 from the middle upholstery layer 931. The insulator layer may be made of fibers or mesh and is suitable to keep the middle upholstery layer 931 in place and to protect the middle upholstery layer 931. In one embodiment, the support layer 939 includes compression springs 971 made from steel or another material suitable for providing resistance to compression of the mattress 915. The material and gauge of the compression springs 971 may by chosen for a particular mattress depending on the desired level of firmness of the mattress.

The mattress 915 includes a central core 981 that may be positioned between the quilting layer 927 and the middle upholstery layer 931. The central core 981 includes a plurality of core members 983 that may be connected by hinges as previously described herein. In one embodiment, the core members 983 may be connected by living hinges 985 made from the same material as core members 983 (see FIG. 20). The core members and hinges allow multi-directional movement (i.e., rotational movement about more than one axis) of the central core 981 when the central core 981 is positioned within the mattress 915. In another embodiment, the central core 981 may include core members 983 without hinges, the core members 983 being positioned in place relative to other core members 983 and then constrained by layers of the mattress 915 adjacent the central core 981.

The central core 981 may be a single article that is shaped to fit within the layers of the mattress 915, or alternatively, multiple central cores 981 may be positioned within the mattress 915 in those areas for which it is desired for the foam layers (or other conformable substrates) of the mattress 915 to have additional resistance to compression or impact. The central core 981 may be placed such that in a resting state, the central core 981 is substantially parallel to the bedding surface 945. In the embodiment illustrated in FIG. 21, only a single layer of core members 983 is provided. In other embodiments, multiple layers of core members 983 may be positioned adjacent one another or dispersed throughout the layers of the mattress 915.

While the central core 981 has been illustrated in FIGS. 20 and 21 as being positioned beneath the quilting layer 927, the central core 981 may be positioned in any position that allows the central core 981 to assist in distributing impact or compressive forces delivered to the mattress 915. In one embodiment, the central core 981 may be positioned above the quilting layer 927 and may be covered by a fabric or flexible membrane. Alternatively, the central core 981 could be bonded or otherwise adhered to the bedding surface 945 of the quilting layer 927. In another embodiment, the central core 981 may be placed on a side of the one or more layers of the middle upholstery layer 931 opposite a side nearest the quilting layer 927. In still another embodiment, the central core 981 may be placed between the middle upholstery layer 931 and the insulator layer 935, or between the insulator layer 935 and the support layer 939.

When a double-sided mattress is provided, the mattress may that includes middle upholstery layers 931 and quilting layers 927 on both sides of the support layer 939. In such an instance, the mattress includes two bedding surfaces 945, one on each side of the mattress. Similarly, the mattress may include two central cores 981, one associated with each side of the mattress. Each central core 981 may be placed among the layers of the mattress as previously described.

The presence of the central core 981 in mattress 915 permits better distribution of loads exerted by a user of the mattress. As a load is applied to the central core 981, the core members 983 near an area to which the load is applied deflect. The core members 983 are able to absorb some of the load, which alleviate some of the load being transferred to other layers, such as foam layers, adjacent the central core 981. The hinges 985 permit transfer of point or area loads from core members 983 to adjacent core member 983, which assists in distributing the load across a larger area. By distributing the load applied to a mattress over a larger area, the quilting, foam, or other conformable substrates associated with the mattress are less prone to compression-set, in which the quilting, foam, or other conformable substrates are unable to return to a pre-compressed state. This in turn results in a mattress with a longer effective life.

In addition to providing an increase in longevity, the central core may be used to increase the firmness of a mattress. This may be accomplished by layering multiple flexible cores within the mattress. Alternatively, a flexible core made from thicker core member or hinges may be used. In another embodiment, the flexibility of the material that makes up the hinges or the core members may be selected based on the desired stiffness of the mattress.

A person of ordinary skill in the art will recognize that while FIGS. 20 and 21 present use of a central core with a traditional, inner-spring mattress, the central core may be similarly used with a latex or other foam mattress that does not include springs.

Figure 22:
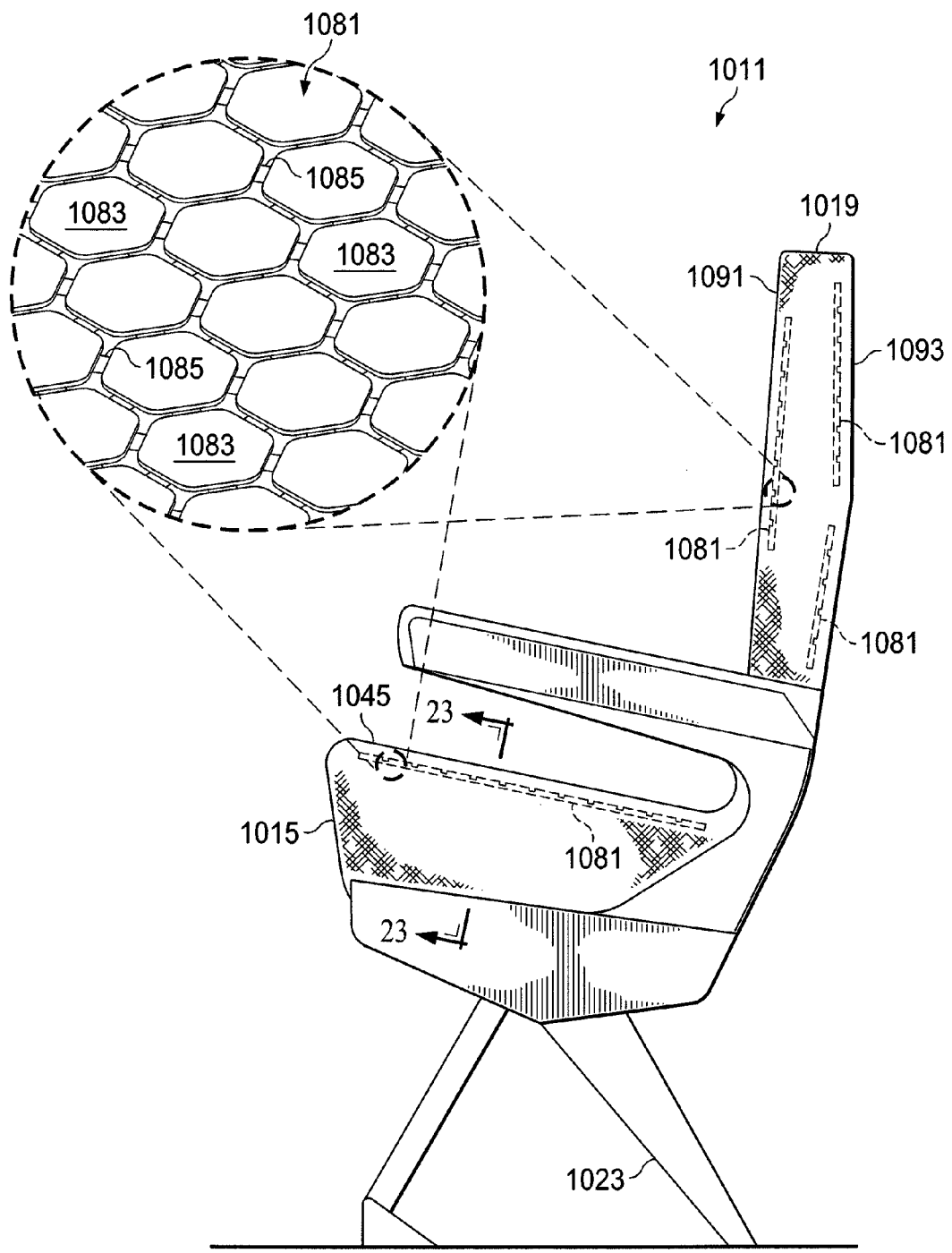
FIG. 22 depicts a side view of a passenger seat according to an illustrative embodiment, the passenger seat having a central core.
Figure 23:
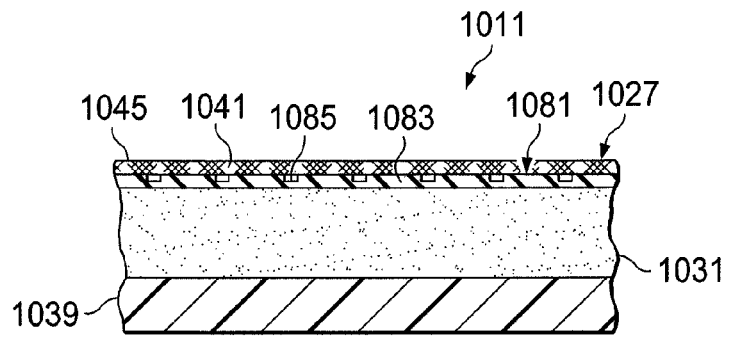
FIG. 23 illustrates a cross-sectional front view of the passenger seat of FIG. 22 taken at 23-23.

Referring to FIGS. 22 and 23, a passenger seat 1011 according to an illustrative embodiment includes a lower support member 1015 and a back support member 1019. A base 1023 may be provided to securely attach the lower support member 1015 to a floor of a vehicle. In one embodiment the vehicle may be a an airplane, while in another embodiment the vehicle may be a car, truck, or other automobile. Still other possibilities include helicopters, boats, submarines, earth-moving equipment, tractors, industrial equipments, or any other type of vehicle capable of transporting or housing passengers, a pilot, driver, or operator.

The lower support member 1015 may include a plurality of layers including, for example, a quilting layer 1027, an upholstery layer 1031, and a support layer 1039 (see FIG. 23). In one embodiment, the quilting layer 1027 may include a fabric 1041, or ticking, having a seating surface 1045 on which a user of the passenger seat 1011 will sit. The fabric 1041 may also include a light foam or fibers stitched to an underside of the fabric 1041. The fabric 1041 may be used to encase the lower support member 1015 and provides a soft surface texture to the passenger seat 1011. The fabric 1041 may be made of synthetic fibers like polyester or acrylic, or of natural materials such as latex, cotton, silk, leather and wool. The fabric 1041 may also be made from any of the other fabric or flexible membrane materials described herein, such as for example those associated with flexible membranes 317, 317, 517.

The upholstery layer 1031 of the passenger seat 1011 may be positioned beneath the quilting layer 1027, and may include one or more conformable materials that allow some compression of the passenger seat 1011 but that also provide comfort to the user of the passenger seat 1011. The upholstery layer 1031 may include one or more foam layers, such as for example foam layer 1051. The foam layer 1051 (and any additional foam layers) may be any type of foam including without limitation open or closed-cell foams. More specifically, the foams may be made from viscoelastic foam materials, felt, polyester fibers, cotton fibers, or non-woven fiber pads. The foam layers may also be made from any of the other foam or conformable substrate materials described herein, such as for example those associated with conformable substrates 13, 113, 213, 313, 413, 513.

Beneath the upholstery layer 1031, the support layer 1039 is positioned to provide additional support for the user of the passenger seat 1011. The support layer 1039 may be a molded plastic or metal tub that is formed to cradle and support the additional layers of the seat 1011 and the body of the user. Alternatively, or in addition to a rigid frame or support, a plurality of compression springs (not illustrated) made from steel or another material may be included in the support layer 1039 to provide further resistance to compression. The material and gauge of the compression springs may by chosen for a particular seat depending on the desired level of firmness of the passenger seat.

The passenger seat 1011 includes a central core 1081 that may be positioned between the quilting layer 1027 and the upholstery layer 1031. The central core 1081 includes a plurality of core members 1083 that may be connected by hinges as previously described herein. In one embodiment, the core members 1083 may be connected by living hinges 1085 made from the same material as core members 1083 (see FIG. 22). The core members and hinges allow multi-directional movement (i.e., rotational movement about more than one axis) of the central core 1081 when the central core 1081 is positioned within the passenger seat 1011. In another embodiment, the central core 1081 may include core members 1083 without hinges, the core members 1083 being positioned in place relative to other core members 1083 and then constrained by layers of the passenger seat 1011 adjacent the central core 1081.

The central core 1081 may be a single article that is shaped to fit within the layers of the lower support member 1015, or alternatively, multiple central cores 1081 may be positioned within the lower support member 1015 in those areas for which it is desired for the foam layers (or other conformable substrates) of the lower support member 1015 to have additional resistance to compression or impact. The central core 1081 may be placed such that in a resting state, the central core 1081 is substantially parallel to the seating surface 1045. In the embodiment illustrated in FIG. 23, only a single layer of core members 1083 is provided. In other embodiments, multiple layers of core members 1083 may be positioned adjacent one another or dispersed throughout the layers of the lower support member 1015.

While the central core 1081 has been illustrated in FIGS. 22 and 23 as being positioned beneath the quilting layer 1027, the central core 1081 may be positioned in any position that allows the central core 1081 to assist in distributing impact or compressive forces delivered to the lower support member 1015. In one embodiment, the central core 1081 may be positioned above the quilting layer 1027 and may be covered by a fabric or flexible membrane. Alternatively, the central core 1081 could be bonded or otherwise adhered to the seating surface 1045 of the quilting layer 1027. In another embodiment, the central core 1081 may be placed on a side of the upholstery layer 1031 opposite a side nearest the quilting layer 1027.

While the layers of the lower support member 1015 have been illustrated in FIG. 23, a similar configuration of layers may be present for back support member 1019. A quilting layer or fabric on one side of the back support member 1019 defines a back rest surface 1091, which supports a back of the user of the passenger seat 1011. A quilting layer or fabric on an opposite side of the back support member 1019 defines a rear surface 1093. With respect to the back support member 1019, a support layer similar to support layer 1039 may be positioned the quilting layers forming the back rest surface 1091 and the rear surface 1093. In one embodiment, upholstery layers or foam layers may be provided between each quilting layer and the support layer of the back support member 1019. As is illustrated in FIG. 22, one or more central cores 1081 may be associated with the back support member 1019, one or more being positioned nearer the back rest surface 1091 and one or more being positioned near the rear surface 1093.

The presence of the central core 1081 in passenger seat 1011 permits better distribution of loads exerted by a user of the seat. As a load is applied to the central core 1081, the core members 1083 near an area to which the load is applied deflect. The core members 1083 are able to absorb some of the load, which alleviate some of the load being transferred to other layers, such as foam layers, adjacent the central core 1081. The hinges 1085 permit transfer of point or area loads from core members 1083 to adjacent core member 1083, which assists in distributing the load across a larger area. By distributing the load applied to the seat over a larger area, the quilting, foam, or other conformable substrates associated with the seat are less prone to compression-set, in which the quilting, foam, or other conformable substrates are unable to return to a pre-compressed state. This in turn results in a seat with a longer effective life.

In addition to providing an increase in longevity, the central core may be used to increase the firmness of a seat. This may be accomplished by layering multiple flexible cores within the seat. Alternatively, a flexible core made from thicker core member or hinges may be used. In another embodiment, the flexibility of the material that makes up the hinges or the core members may be selected based on the desired stiffness of the seat.

The presence of the central core 1081 in the back support member 1019 near the rear surface 1093 aids in distributing impact loads that may strike the back support member 1019 on the rear surface 1093. For example, when the passenger seat 1011 is a seat in an airplane, the rear surface 1093 may be impacted by another passenger or a some other object during an emergency. The core members and hinges, by providing paths for load transfer and distribution, distribute the impact loads, thereby protecting the user of the seat, and possibly lessening injury or damage to the person or object striking the seat.

A person of ordinary skill in the art will recognize that while FIGS. 22 and 23 present use of a central core with a passenger seat, the central core may be similarly used with chairs, sofas, or other seating of any kind.

The combined use of a central core with a conformable substrate as described herein assists in distributing forces, both impact and other forces. This force distribution results in lesser peak loads and forces being transmitted to the person, or item, or product with which the central core and conformable substrate are associated. A portion of the force distribution may be attributed to initial deflections of individual core members that are exposed to a point or area load. Additional distribution of the load is provided by the flexion or rotation of the affected core members relative to adjacent core members, as well as the transmission of loads through hinges to the adjacent core members.

Figure 24:
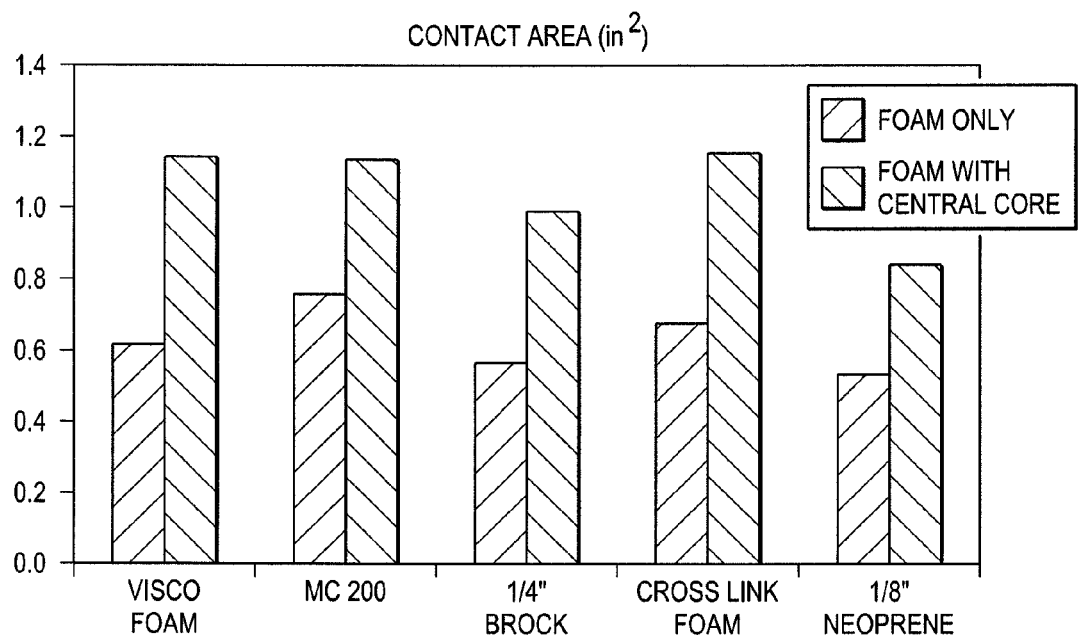
FIG. 24 depicts a graph of test data demonstrating contact area testing performed on conformable substrates alone and conformable substrates with a central core.
Figure 25:
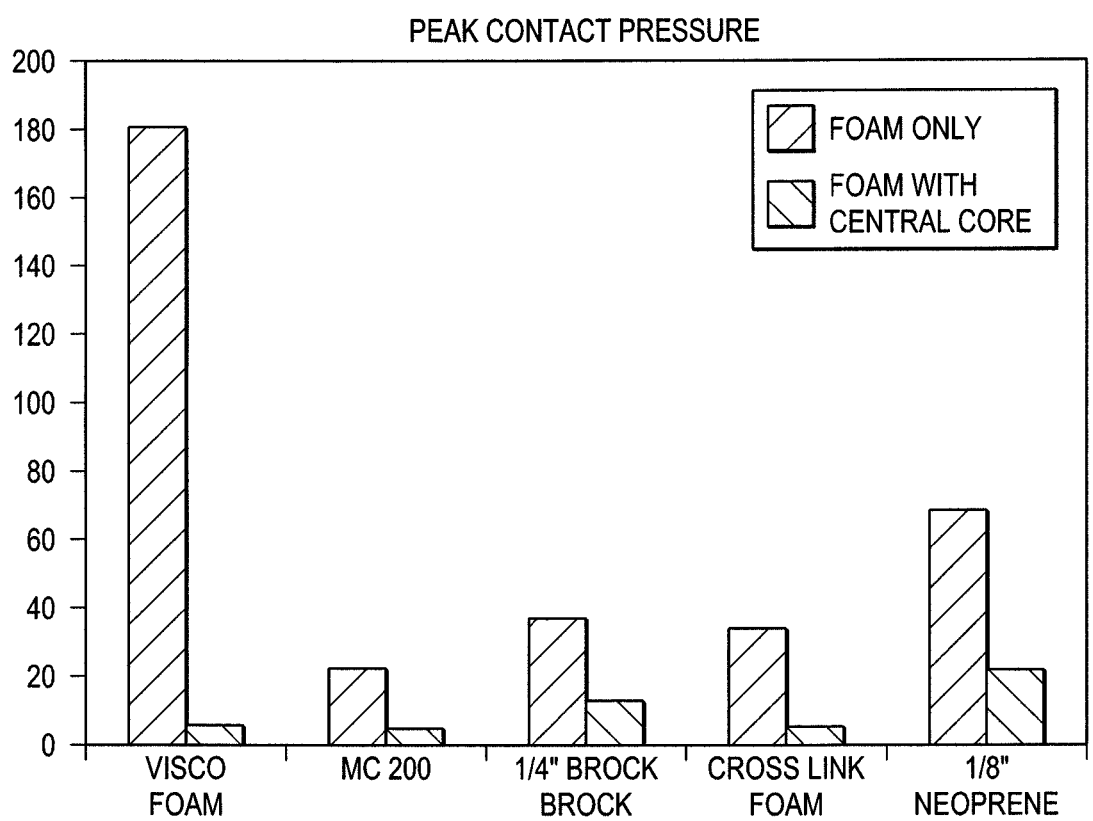
FIG. 25 illustrates a graph of test data demonstrating peak pressure testing performed on conformable substrates alone and conformable substrates that include a central core.

Laboratory testing was performed to determine the effectiveness of the central cores described herein at dispersing impact. A high-speed Medscan (Tekscan) pressure mapping program was used to capture data regarding contact area and peak pressure when impact forces were applied to the tested materials. A comparative analysis was made between several conformable substrates (e.g. foam products) and the same foam products covered with the central cores. In the testing that was performed, the central cores included hexagonal core members connected to adjacent core members by living hinges made from the same material as that of the core members. Table 1 presents the data collected for contact area testing, and a graph illustrating this data is provided in FIG. 24. As can be seen from FIG. 24, the load was distributed over a much larger area when the central core was placed adjacent each foam. FIG. 25 illustrates peak contact pressure values observed for each testing scenario. The measured contact pressure was much less when the central core was positioned adjacent the foam.

TABLE 1

|  | Foam Only | Foam with Central Core |
| --- | --- | --- |
| Visco Foam | 0.62 | 1.15 |
| MC200 | 0.76 | 1.14 |
| ¼" Brock | 0.57 | 1 |
| Cross Link Foam | 0.68 | 1.16 |
| ⅛" Neoprene | 0.53 | 0.84 |

To further demonstrate the effectiveness of the central core, the contact area and peak pressure testing was repeated with non-connected hard plates positioned over the foam. While some improvement was noted compared to the foam alone, the improvement was substantially less than the improvement noted when using the central core, with interconnected core members. The hinges of the central core allow for impact dispersion to be spread across a wider area, thus reducing impact forces. Additionally, the hinged core members prevent individual plates from over-rotating or over-tilting, thereby improving the plate's peak pressure dispersive properties as compared to non-connected plates.

As can be seen from the preceding examples, the application of the protective guards and central cores described herein are not limited and may include any application where it is desired to protect humans, animals, or non-living articles or equipment from impact and other forces.

It should be apparent from the foregoing that an invention having significant advantages has been provided. While the invention is shown in only a few of its forms, it is not just limited but is susceptible to various changes and modifications without departing from the spirit thereof.

I claim:

1. A method of improving an impact-protective property of a conformable substrate, the method comprising:

securing a central core adjacent the conformable substrate, the central core having a plurality of rigid plates, wherein the plates are more rigid than the substrate, the plurality of rigid plates comprise at least three plates, each of the three plates has one or more edges hingedly joined to two or more other plates in the plurality of rigid plates by respective hinges, each of the hinges joins less than the entire respective hingedly attached edge to an edge of a corresponding other substantially adjacent plate in the corresponding two or more other plates, each of the hinges comprises a respective living hinge formed integrally with each of the corresponding plates, each of the hinges and hingedly attached edges of the plates are formed entirely from the same material, and each of the hinges is less thick than the plates joined using the hinge.

2. The method of claim 1, wherein each of the hinges interposes the corresponding plate and each corresponding other substantially adjacent plate such that the edge of plate is offset from the corresponding edge of the corresponding other plate.

3. The method of claim 1, wherein the conformable substrate is an elastomeric substrate.

4. The method of claim 1 further comprising:
positioning a flexible fabric membrane comprised of natural or synthetic fibers adjacent to at least one of the conformable substrate and the central core.

5. The method of claim 4 further comprising:
bonding at least a portion of the fabric to at least one of the conformable substrate and the central core.

6. The method of claim 1, wherein the joining of the rigid plates allows multidirectional rotation of the central core.

7. The method of claim 1 further comprising:
bonding at least a portion of the plurality of rigid plates to the conformable substrate.

8. The method of claim 1, wherein positioning the central core further comprises:
positioning the central core within a pocket disposed on a surface of the conformable substrate.

9. The method of claim 8, wherein the central core is removably positioned within the pocket through an entry slot.

10. The method of claim 1, wherein the plates are hexagonal in shape.

11. The method of claim 10, wherein:
some of the rigid plates are disposed in an outer perimeter region and others of the rigid plates are disposed in an inner region; and
each of the rigid plates in the inner region is hingedly attached on each of six edges to an adjacent rigid plate.

12. A method of distributing an impact load over a contact area, the method comprising:
positioning a conformable substrate over the contact area; and
securing a central core adjacent the conformable substrate, the central core having a plurality of rigid plates, wherein the plates are more rigid than the substrate, the plurality of rigid plates comprise at least three plates, each of the three plates has one or more edges hingedly joined to two or more other plates in the plurality of rigid plates by respective hinges, each of the hinges joins less than the entire respective hingedly attached edge to an edge of a corresponding other substantially adjacent plate in the corresponding two or more other plates, each of the hinges comprises a respective living hinge formed integrally with each of the corresponding plates, each of the hinges and hingedly attached edges of the plates are formed entirely from the same material, and each of the hinges is less thick than the plates joined using the hinge; and
wherein securing the central core adjacent the conformable substrate increases the contact area over which the impact load is distributed.

13. The method of claim 12, wherein:
at least a portion of the impact load is distributed through the hinges.

14. The method of claim 12 further comprising:
allowing multi-directional rotation of each rigid plate relative adjacent rigid plates.

15. The method of claim 12 further comprising:
transmitting a portion of the impact load from one of the rigid plates to the another of the rigid plates through the at least one hinge.

16. The method of claim 12 further comprising:
positioning a flexible fabric membrane comprised of natural or synthetic fibers adjacent to at least one of the conformable substrate and the central core.

* * * * *